Figure 1:
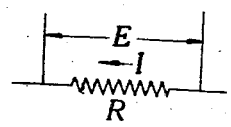

May 11, 1943.   C. L. BLACKBURN   2,319,106
ELECTRICAL CALCULATING MACHINE
Filed May 21, 1937   10 Sheets-Sheet 1

INVENTOR
C. L. BLACKBURN
BY
ATTORNEYS

May 11, 1943.　　　C. L. BLACKBURN　　　2,319,106
ELECTRICAL CALCULATING MACHINE
Filed May 21, 1937　　　10 Sheets-Sheet 2
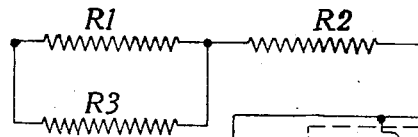
Fig. 9.
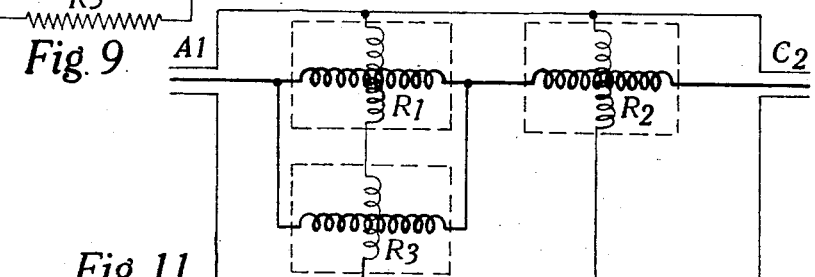
Fig. 10.
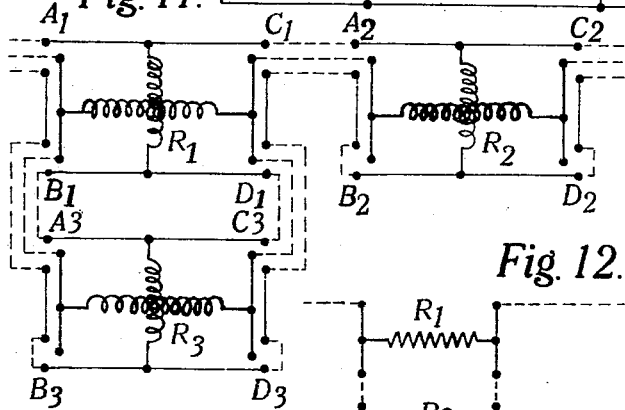
Fig. 11.
Fig. 12.
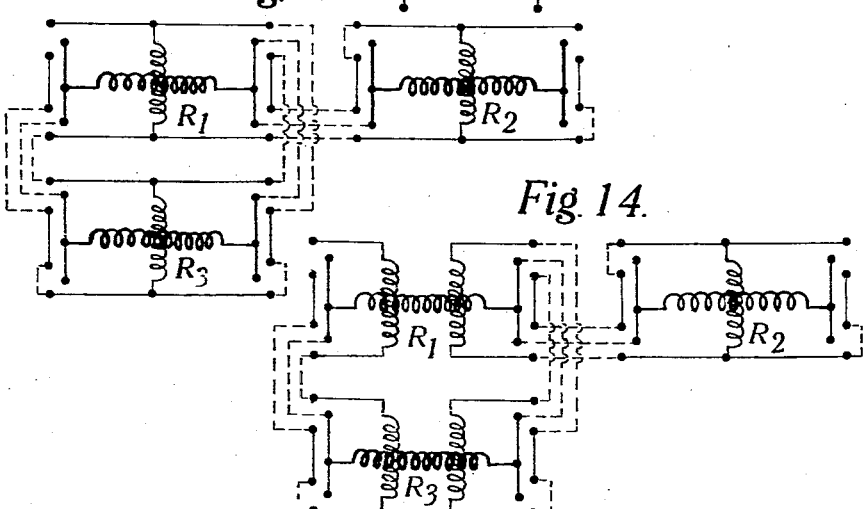
Fig. 13.
Fig. 14.
INVENTOR
C. L. BLACKBURN
BY
ATTORNEYS

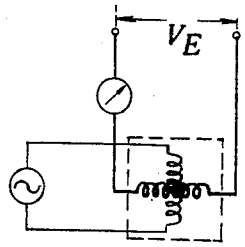
Fig. 15.
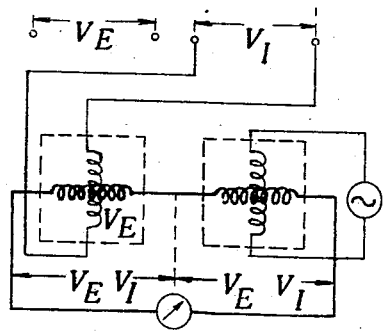
Fig. 16.
Fig. 17.
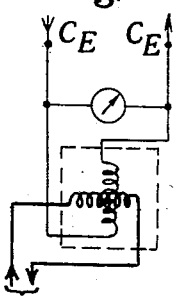
Fig. 18.
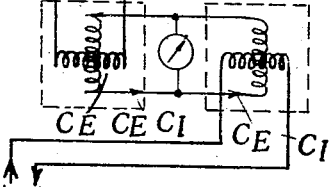
Fig. 19.
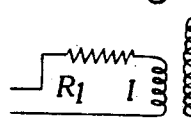
Fig. 20.
Fig. 21.
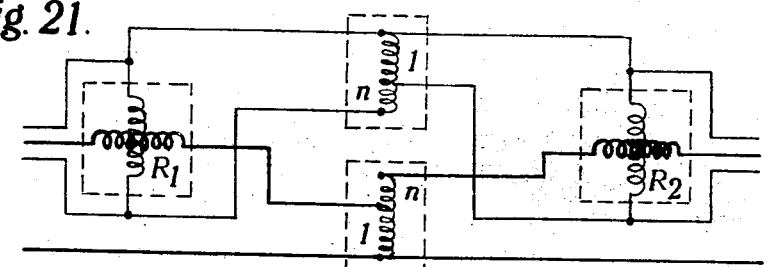
Fig. 22.
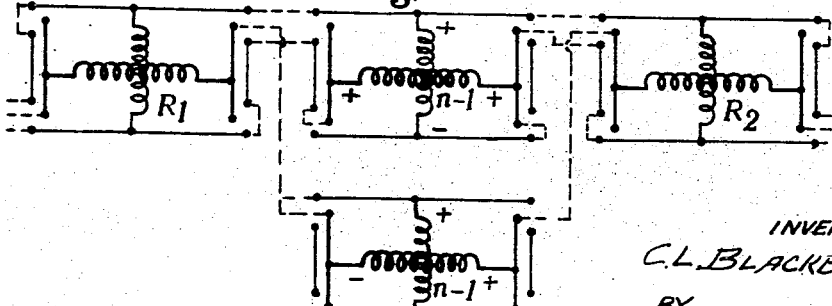

May 11, 1943.    C. L. BLACKBURN    2,319,106
ELECTRICAL CALCULATING MACHINE
Filed May 21, 1937    10 Sheets-Sheet 4

INVENTOR
C. L. BLACKBURN.
BY
ATTORNEYS

May 11, 1943.  C. L. BLACKBURN  2,319,106
ELECTRICAL CALCULATING MACHINE
Filed May 21, 1937  10 Sheets-Sheet 6

INVENTOR
C. L. BLACKBURN
BY
ATTORNEYS

May 11, 1943.　　　C. L. BLACKBURN　　　2,319,106
ELECTRICAL CALCULATING MACHINE
Filed May 21, 1937　　　10 Sheets-Sheet 7

INVENTOR
BY C. L. BLACKBURN
ATTORNEYS

May 11, 1943.   C. L. BLACKBURN   2,319,106
ELECTRICAL CALCULATING MACHINE
Filed May 21, 1937   10 Sheets-Sheet 8

INVENTOR
C. L. BLACKBURN
BY
ATTORNEYS

May 11, 1943.  C. L. BLACKBURN  2,319,106
ELECTRICAL CALCULATING MACHINE
Filed May 21, 1937   10 Sheets-Sheet 9
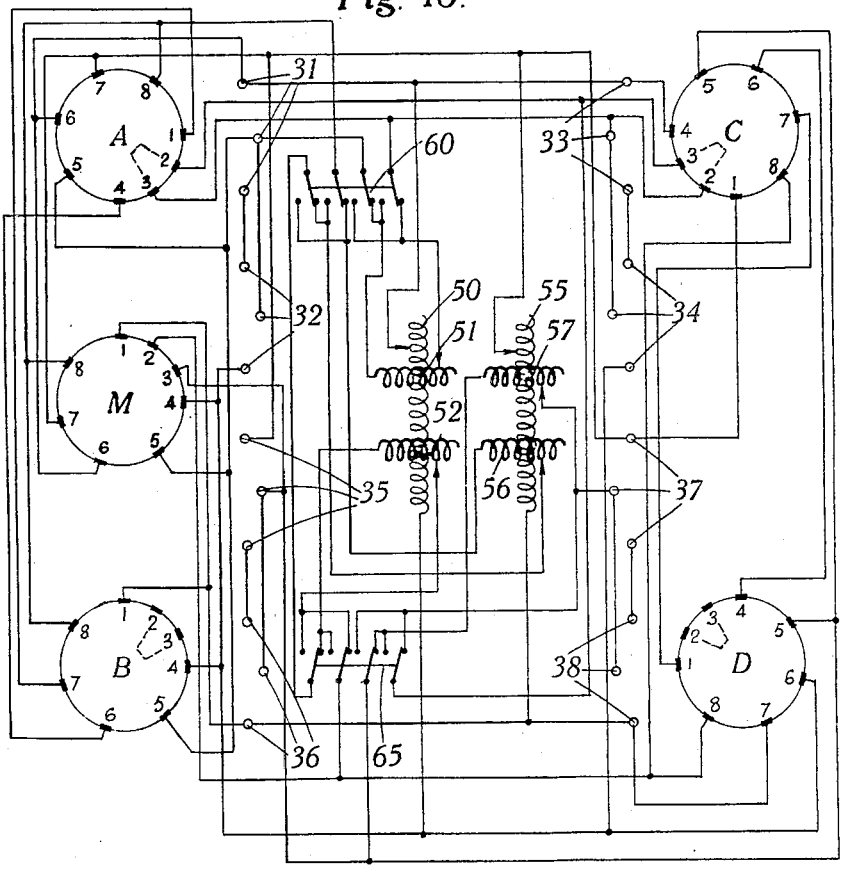
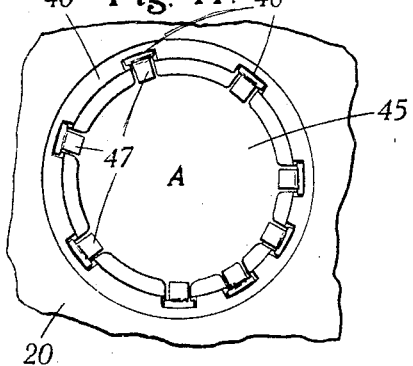
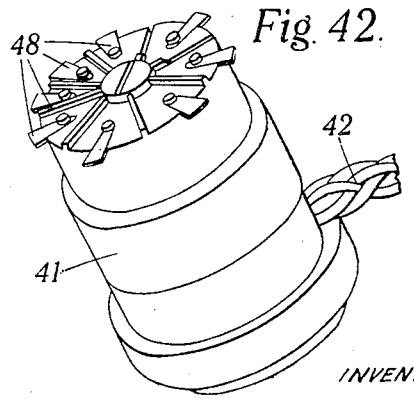
INVENTOR
C. L. BLACKBURN.
BY
ATTORNEYS May 11, 1943.  C. L. BLACKBURN  2,319,106
ELECTRICAL CALCULATING MACHINE
Filed May 21, 1937    10 Sheets-Sheet 10

INVENTOR
C. L. BLACKBURN
BY
ATTORNEYS

Patented May 11, 1943

2,319,106

UNITED STATES PATENT OFFICE 2,319,106

ELECTRICAL CALCULATING MACHINE

Charles Lord Blackburn, Westminster, London, England, assignor to Electrical Improvements Limited, Newcastle-on-Tyne, England, a company of Great Britain Application May 21, 1937, Serial No. 144,081
In Great Britain May 27, 1936

9 Claims. (Cl. 235—61)

This invention relates to a machine for electrically performing mathematical calculations and to apparatus for use in or in association with such a machine. The invention is more especially concerned with improvements in a calculating machine of the type known in itself, wherein a number of transformers carrying suitably interconnected windings having numbers of turns dependent on the calculations to be made are employed in association with means for exciting at least one of the transformer windings and means for measuring the voltages or currents induced in the various windings.

One object of the invention is to adapt such a machine to the purpose of evaluating quantities associated with a structural framework or electrical network or other interconnected assembly of the kind in which each element of the assembly has associated with it certain fixed quantities and certain variable quantities which are interrelated by one or more equations, such equations being of a like nature for all the elements of the assembly, whilst the variable quantities of a like character for the various elements of the assembly are also interrelated by one or more equations. Thus for instance in an electrical network the fixed quantities such as resistance and reactance and the variable quantities such as current and voltage associated with each section are interrelated by equations such as Ohm's law, whilst the various currents and voltages throughout the network are interrelated by equations such as Kirchoff's laws.

For this purpose the calculating machine may comprise a number of units, one for each element of the assembly, each unit having one or more transformers provided with two or more windings, whose ratios represent the values of the fixed quantities associated with the element, with such interconnections (if any) between the windings of each unit as may be necessary to represent the relation or relations between the fixed and variable quantities associated with the element, in combination with means for connecting each winding or group of windings of a unit to the corresponding windings of the other units in an independent circuit individual to the variable quantities of one character in the assembly, the connections of at least one of such independent circuits corresponding directly with the actual connections of the elements of the assembly whilst those of at least one other independent circuit correspond reciprocally with the actual assembly connections, means for energising one or more of the windings from an A. C. source, and means for measuring the voltage or current induced in a winding or group of windings or other chosen part of one of the independent circuits, the arrangement being such that the voltages or currents induced in the windings or groups of windings of each unit represent the values of the variable quantities associated with the corresponding element of the assembly. In some instances, in addition to the independent circuits in which the connections correspond directly or reciprocally to the actual assembly connections, there may be one or more further independent circuits in which the corresponding windings or groups of windings of the various units are connected in other ways, for example in series or in parallel with one another.

In one simple arrangement each unit has a single transformer carrying two windings, of which one is connected to the corresponding windings of the other units in a circuit whose connections correspond reciprocally to the actual connections of the elements of the assembly, whilst the second is connected to the corresponding windings of the other units in an independent circuit whose connections correspond directly to the actual connections of the assembly elements, at least one of the windings of each unit preferably being adjustable as to its number of effective turns to enable the turns-ratio of the two windings to be set to suit the appropriate fixed quantity associated with the corresponding assembly element. Such an arrangement, which involves what may be termed "two-circuit working," will adequately serve for the purpose of making calculations associated with D. C. electrical networks or other assemblies in which the fixed and variable quantities are scalar quantities, but a somewhat more complicated arrangement involving "four-circuit working" will usually be required for calculations associated with A. C. electrical networks or other assemblies wherein the calculations include, for instance, the multiplication of complex or planar vector quantities.

In such an arrangement for four-circuit working, each unit preferably has two pairs of windings or groups of windings magnetically interlinked with one another in such a manner that the voltages or currents induced in the two windings or winding groups of each pair represent the resolved components of a variable planar vector quantity associated with the corresponding assembly element, the two windings or winding groups of the first pair being connected to the corresponding windings of the other units respectively in two independent circuits whose connections correspond reciprocally to the actual connections of the elements of the assembly, whilst the two windings or winding groups of the second pair are connected to the corresponding windings of the other units respectively in two further independent circuits whose connections correspond directly to the actual assembly element connections. Conveniently each unit has two transformers each carrying three windings, the first winding on the first transformer and the first winding on the second transformer respectively constituting the two windings of the first pair, whilst the second winding on the second transformer is connected in series with the third winding on the first transformer to constitute one of the winding groups of the second pair, and the second winding on the first transformer is connected in series with the reversed third winding on the second transformer to constitute the other winding group of the second pair. Preferably two or all of the windings on each transformer are adjustable, each simultaneously with the corresponding winding on the companion transformer, as to their numbers of effective turns to enable the turns-ratios to be set to suit the appropriate fixed quantities associated with the corresponding assembly element.

In practice it is convenient with all these arrangements to provide each unit with switching means (for example of the multi-pin plug and socket type) for simultaneously controlling the independent circuits to enable the connections between the units to be varied to suit different connections between the elements of the assembly.

The invention may be carried into practice in various ways, but some convenient arrangements according thereto will now be described with the aid of the accompanying drawings, which for the most part are diagrams illustrating the basic principles underlying the various features of the invention.

In these drawings—

Figure 23:
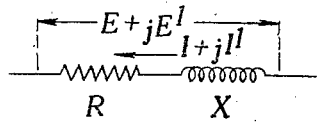
Figure 24:
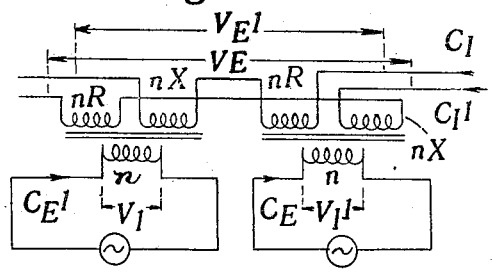
Figure 25:
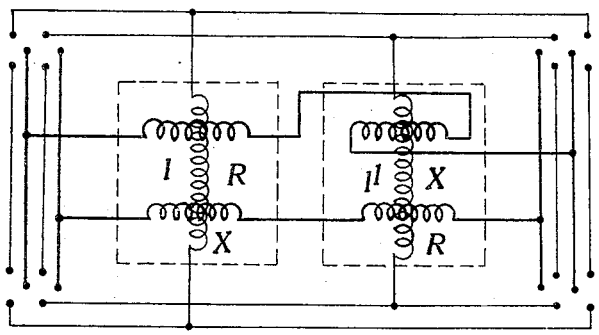
Figure 26:
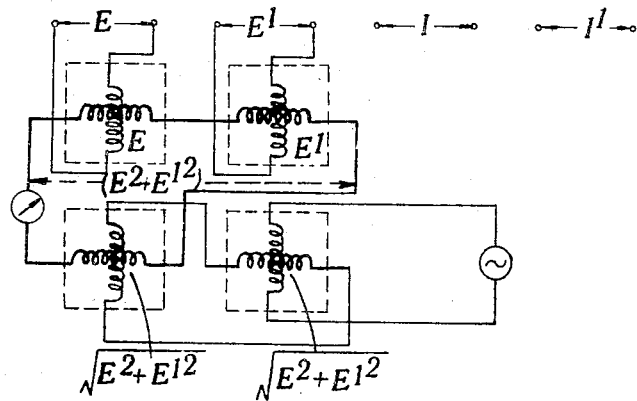
Figure 28:
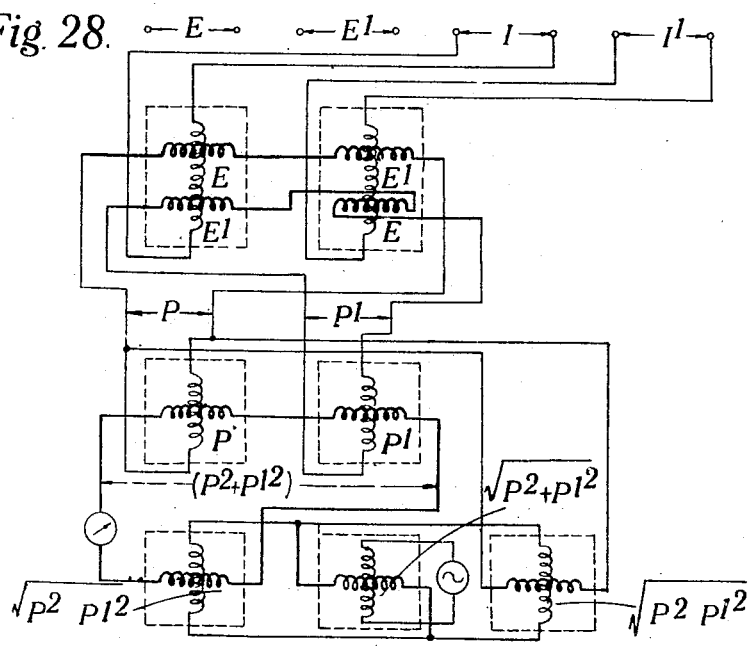
Figure 29:
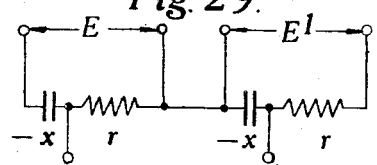
Figure 30:
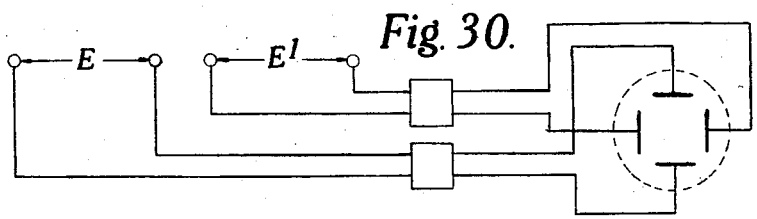
Figure 31:
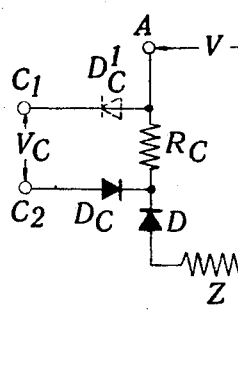
Figure 32:
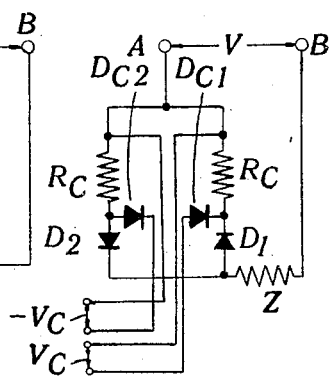
Figure 33:
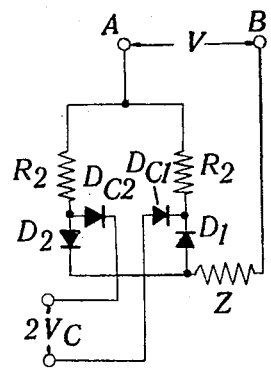
Figure 34:
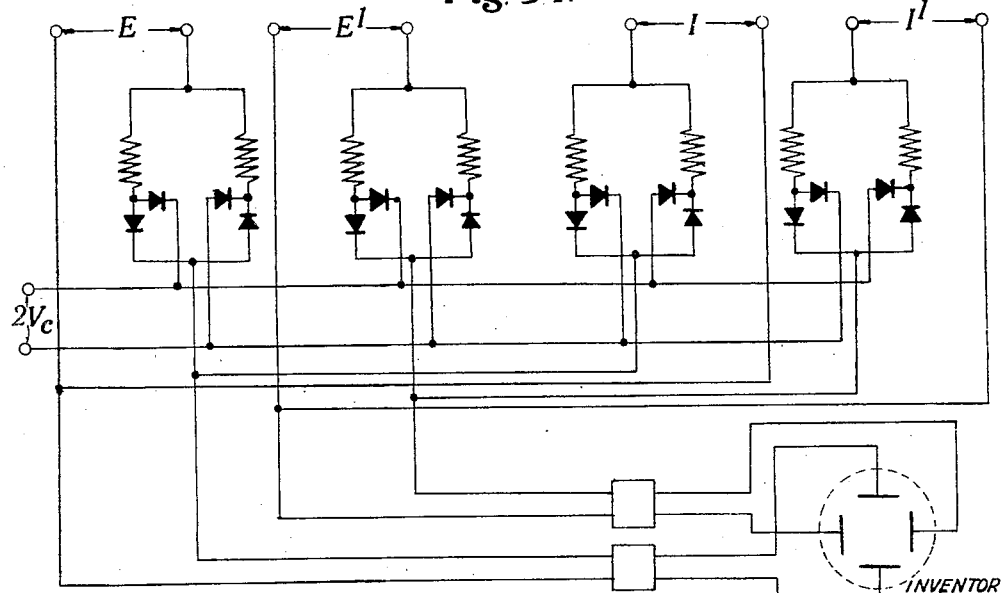
Figure 35:
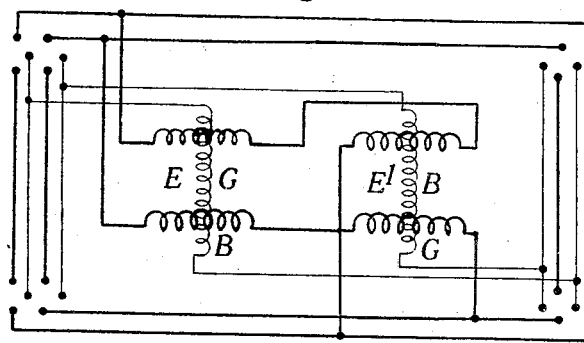
Figure 37:
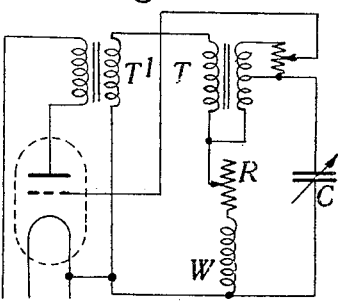
Figure 36:
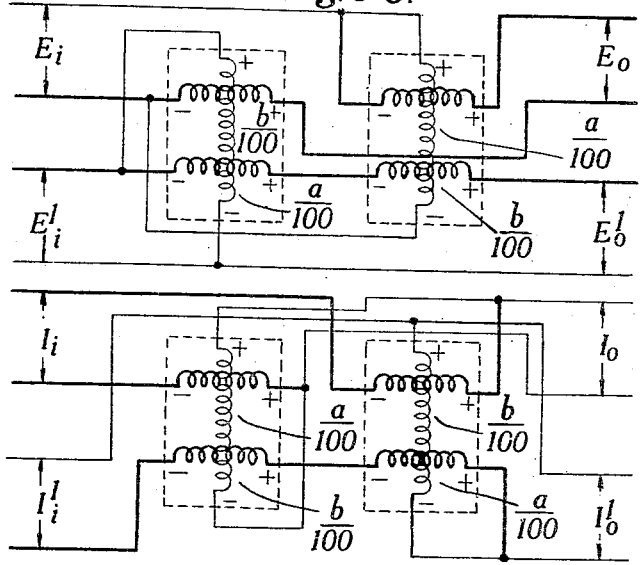
Figure 38:
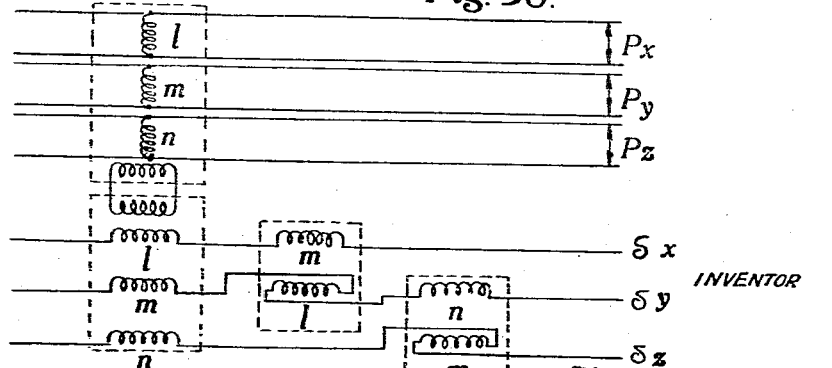
Figure 39:
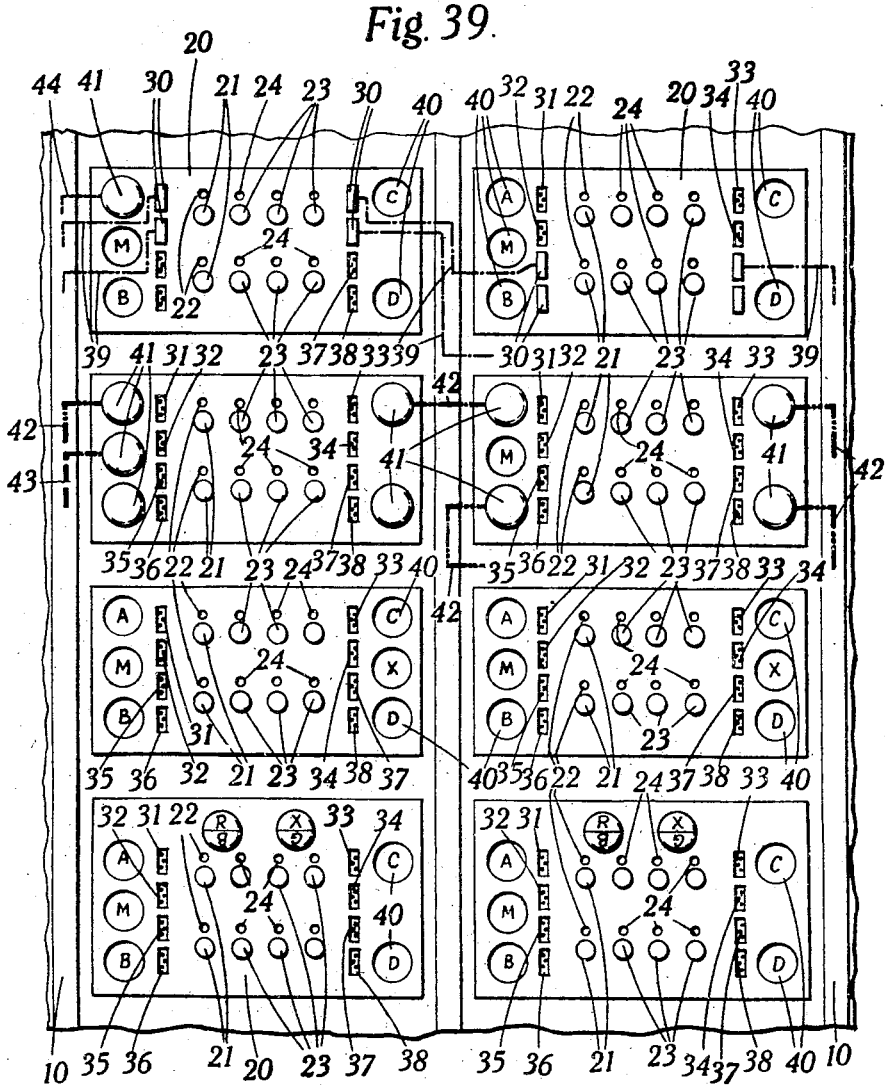
Figure 43:
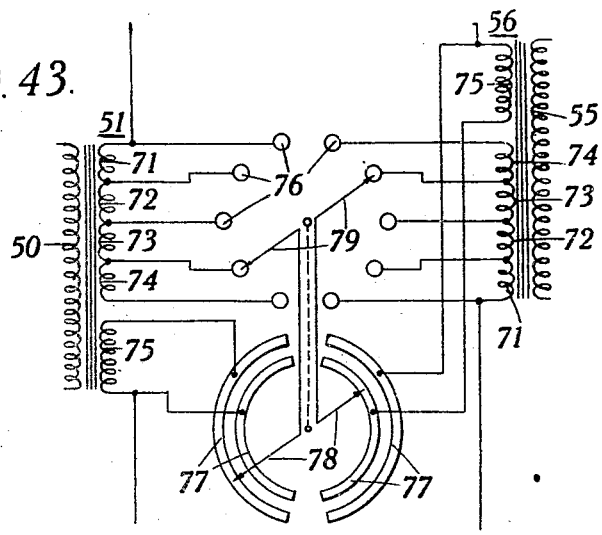
Figure 44:
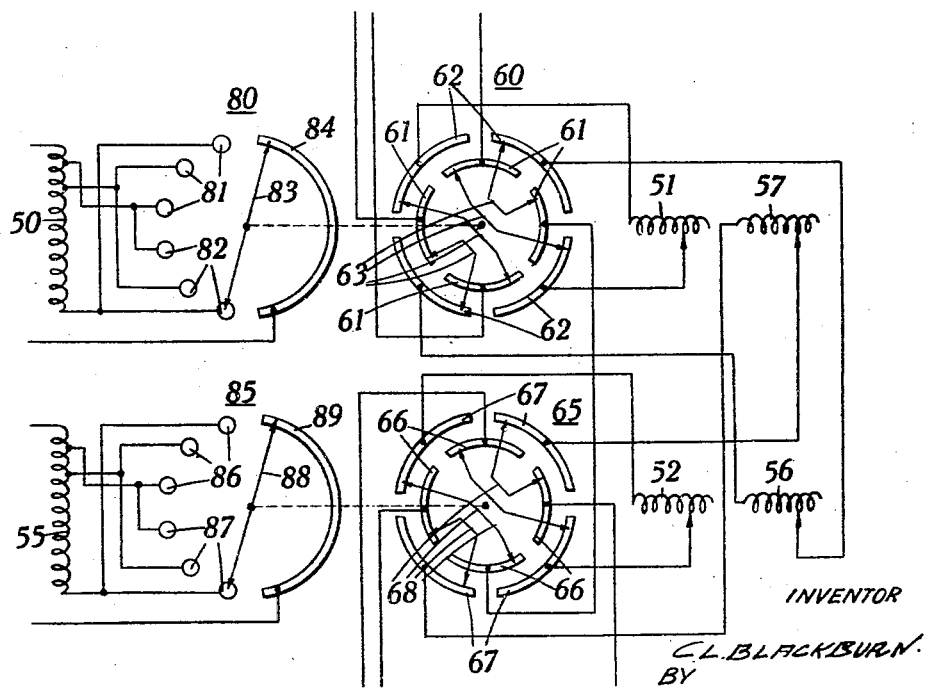

Figures 1–8 illustrate the basic principle underlying the use of the invention for effecting calculations associated with electrical networks or other assemblies, Figures 9–14 show diagrammatically the manner in which such basic principle is utilised in a calculating machine operating with two-circuit working, Figures 15–18 are diagrams illustrating a metering unit for use with such a machine, Figures 19–22 show one way of representing a power transformer in the machine, Figures 23–25 relate to a unit of an alternative form of calculating machine arranged for four-circuit working, Figures 26–29 show metering arrangements for such a machine, Figure 30 illustrates an arrangement for giving a graphic representation of a planar vector quantity, Figures 31–33 show a device for interrupting the supply from a source of electrical energy to a load, Figure 34 illustrates the application of such interrupting device to the arrangement of Figure 30 to give a graphic representation simultaneously of two planar vector quantities, Figure 35 illustrates a modification of the unit shown in Figure 25, Figure 36 shows an arrangement for representing an induction regulator in a calculating machine operating with four-circuit working, Figure 37 shows a device for affording compensation for transformer errors in the calculating machine, Figure 38 illustrates an application of the calculating machine to the evaluation of quantities associated with a structural framework, Figure 39 is a front elevation of a group of panels forming part of a practical calculating machine for effecting calculations associated more especially with electrical networks and arranged to operate either with two-circuit working or with four-circuit working, Figure 40 is a diagram indicating the more important wiring connections in a panel of the machine shown in Figure 39, Figure 41 is an enlarged view of one of the eight-terminal sockets provided on the panels of the machine, Figure 42 shows a plug for cooperation with the socket of Figure 41, Figure 43 shows diagrammatically one of the tapping switches used in the machine, and Figure 44 shows diagrammatically a combined tapping and reversing switch used in the machine.

The first arrangement illustrated in Figures 1–22 is a simple arrangement involving two-circuit working and is intended for example for the evaluation of voltages, currents and other variable quantities in a D. C. electrical network, or for analogous calculations wherein the fixed and variable quantities can be dealt with as scalar quantities and the complication of vector multiplication does not arise. For simplicity, this arrangement will be described with reference to its use in association with a D. C. network.

In this arrangement the calculating machine consists of a suitably disposed group of panels, one for each element or section of the network. Each panel has a control board behind or beneath which is located a transformer having a laminated core of such manufacture as to minimise ratio errors. The transformer has two windings, which may for convenience of description be referred to respectively as the "basis" winding and the "ratio" winding. Provision is also made for energising these windings from a single-phase A. C. source, either by direct connection of the source to the terminals of one of the windings or by the provision of a separate exciting winding on the transformer core.

Figure 2:
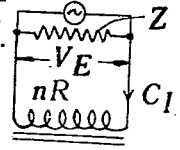

Figures 1 and 2 of the accompanying drawings illustrate the basic principle underlying this arrangement, Figure 1 showing an element of the associated network including a resistance $R$, whilst Figure 2 shows the corresponding transformer in the machine, the basis winding having $n$ turns whilst the ratio winding has $nR$ turns, so that the turns-ratio between the two windings is proportional to the value of the associated network resistance. If the potential difference between the ends of the network resistance is $E$ and the current flowing through the resistance is $I$, then these quantities are related to one another by the equation:

$$E = RI \qquad (1)$$

In a similar manner, if the voltages across the ratio and basis transformer windings are $V_R$ and $V_I$ respectively, then (neglecting transformer errors) these quantities are connected by the equation:

$$V_R = RV_I \qquad (2)$$

It will be noticed that these two Equations 1 and 2 are exactly analogous to one another, so that $V_E$ and $V_I$ can be taken as measures of E and I respectively. Again, if the currents in the basis and ratio transformer windings are $C_E$ and $C_I$ respectively, then (neglecting transformer errors) these quantities are connected by the equation:

$$C_E = RC_I \qquad (3)$$

Equations 1 and 3 are also exactly analogous to one another so that $C_E$ and $C_I$ may be taken as measures of E and I respectively.

Figure 2 shows impedances Z and $Z^1$ connected respectively across the two windings. These impedances may have any convenient value but in practice the most accurate results are secured if they are both made equal to infinity, i. e. an open circuit, or to zero, i. e. a short circuit. In the former case the transformer operates as a potential transformer and the currents flowing are very small (zero in the case of an ideal transformer). In the latter case the transformer operates as a current transformer and the voltages across the windings are very small (zero in the case of an ideal transformer). It is to be noted that the voltage across the ratio winding and the current in the basis winding each represents the network voltage, whilst the voltage across the basis winding and the current in the ratio winding each represents the network current.

Figure 3:
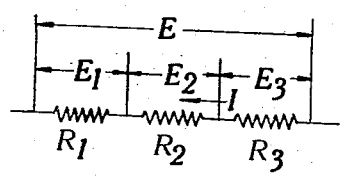
Figure 4:
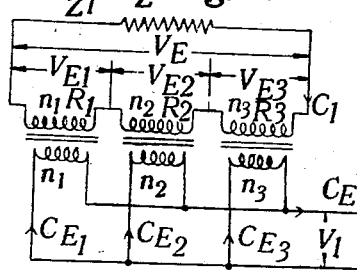

The same analogy in the equations also holds for more complicated networks as will be clear from an examination of Figures 3–8. Thus Figure 3 shows a network consisting of three resistances $R_1$ $R_2$ $R_3$ in series, the potential differences and the current flowing being marked on the drawings. Figure 4 shows the corresponding portion of the machine consisting of three transformers with their ratio windings in series and their basis windings in parallel, the numbers of turns in the windings and the various voltages across them and currents in them being marked on the drawings. The various network quantities are interrelated by the following four equations:

$$\left.\begin{aligned} E_1 &= R_1 I \\ E_2 &= R_2 I \\ E_3 &= R_3 I \\ E &= E_1 + E_2 + E_3 = (R_1 + R_2 + R_3) I \end{aligned}\right\} \qquad (4)$$

Similarly the machine voltages are interrelated by the equations:

$$\left.\begin{aligned} V_{E1} &= R_1 V_I \\ V_{E2} &= R_2 V_I \\ V_{E3} &= R_3 V_I \\ V_E &= V_{E1} + V_{E2} + V_{E3} = (R_1 + R_2 + R_3) V_I \end{aligned}\right\} \qquad (5)$$

Equations 4 and 5 show clearly that the various machine voltages are proportional to the corresponding network variable quantities, and it is to be noted that to obtain the requisite analogy between the sets of equations when the transformers are used as potential transformers, a series connection in the network requires a series connection of the machine ratio windings and a parallel connection of the machine basis windings.

The currents in the various machine windings are interrelated by the equations:

$$\left.\begin{aligned} C_{E1} &= R_1 C_I \\ C_{E2} &= R_2 C_I \\ C_{E3} &= R_3 C_I \\ C_E &= C_{E1} + C_{E2} + C_{E3} = (R_1 + R_2 + R_3) C_I \end{aligned}\right\} \qquad (6)$$

Thus the machine currents are also proportional to the corresponding network variable quantities, but when the transformers are used as current transformers, although the connections are the same as those used in the case of potential transformers, the measurements are made on the opposite windings, i. e. the current in the ratio winding corresponds to the voltage across the basis winding as a measure of the network current, and the current in the basis winding corresponds to the voltage across the ratio winding as a measure of the network voltage.

Figures 6, 7:
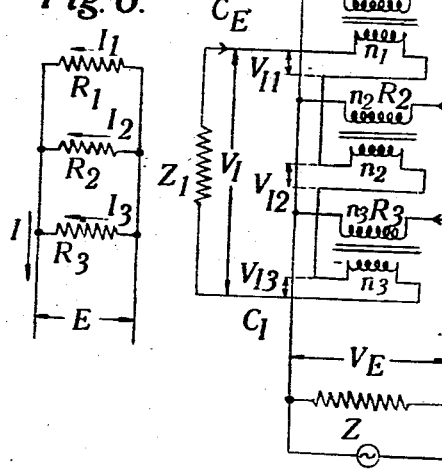

Figures 6 and 7 show three network resistances in parallel, and in this case the three machine transformers have their ratio windings in parallel and their basis windings in series. The network equations are:

$$\left.\begin{aligned} E &= R_1 I_1 = R_2 I_2 = R_3 I_3 \\ I &= I_1 + I_2 + I_3 \end{aligned}\right\} \qquad (7)$$

The corresponding machine voltage equations are:

$$\left.\begin{aligned} V_E &= R_1 V_{I1} = R_2 V_{I2} = R_3 V_{I3} \\ V_I &= V_{I1} + V_{I2} + V_{I3} \end{aligned}\right\} \qquad (8)$$

The impedances Z and $Z^1$ in Figures 4 and 7 may have any convenient value but again the most accurate results are secured in practice if they are zero or infinity. Whatever interconnections are made between various panels the main source of energy in the actual network is represented in the machine circuits by two terminal points on the basis winding circuit and two terminal points on the ratio winding circuit. An impedance may be connected across either of these pairs of terminal points or preferably, as shown, impedances are connected across both pairs, the latter arrangement having the advantage that any transformer winding may be excited. For potential transformer working both impedances are infinite, whilst for current transformer working both impedances are zero.

The machine current equations corresponding to the voltage Equations 8 are:

$$\left.\begin{aligned} C_E &= R_1 C_{I1} = R_2 C_{I2} = R_3 C_{I3} \\ C_I &= C_{I1} + C_{I2} + C_{I3} \end{aligned}\right\} \qquad (9)$$

Figure 5:
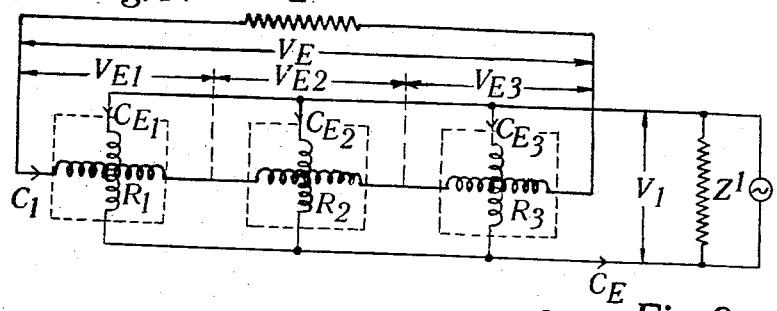
Figure 8:
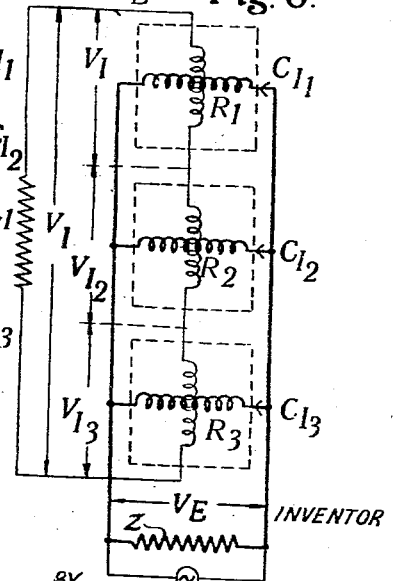

Figures 5 and 8 correspond exactly to Figures 4 and 7 and show a drawing convention, which is especially convenient in the present instance, namely indicating the basis winding and the ratio winding on each transformer at right angles to one another with the basis winding in thin line and the ratio winding in thick line. This convention enables the relationship between the interconnections of the various basis windings and the interconnections of the various ratio windings to be clearly seen. It will be clear from the examples given, that if the connections of the machine ratio windings correspond directly to the actual network connections and the connections of the machine basis windings correspond reciprocally to the actual network connections (i. e. with each mesh connection replaced by a star connection and with each star connection replaced by a mesh connection), then the desired analogy between the network equations and the machine voltage or current equations will hold and the machine voltages or currents can be taken as measures of the network variable quantities, when the turns-ratios of the machine transformers correspond to the network fixed quantities.

It will be noticed that in Figure 4 and 7 the various basis windings are shown as having different numbers of turns, and that the actual numbers of turns are immaterial to the result, provided that the turns-ratio on each transformer is correct. In practice it will usually be convenient normally to employ the same number of turns for all the basis windings of the machine, but tappings are preferably provided to enable the number of effective turns of the winding to be reduced, say, to one-tenth or to one-hundredth of the total number of turns in the full winding, a three-position control swich being provided on the control board to adjust the number of effective turns to the desired value.

The ratio winding is also adjustable as to its number of effective turns, by providing a number of tapping points so arranged that by suitable selection of tappings any number of turns from, say, zero to a thousand can be connected in circuit. The decimal switching provided by the tapping control on the basis winding permits a wider range of adjustment of the turns-ratio between the two windings to be obtained, and also enables the numbers of turns of the two windings to be proportionately reduced (without altering the turns-ratio), if desired, to reduce the flux flowing in the transformer core to a more convenient value. The tapping control switches are operatively connected to an indicating device, which may for instance display in numerical form an indication of the turns-ratio between the two windings, to facilitate setting of the windings to suit the resistance associated with the corresponding network section.

The panel also carries suitable switches for controlling the connections of the two windings to those of the other panels, the switches in each case being arranged to control the connections of both windings simultaneously. Whilst other forms of switches may be used, it will usually be convenient to employ switches of the plug and socket type. In one convenient arrangement each panel is provided with four sockets each cooperating with a three-pin plug on the end of a three-wire flexible lead having another three-pin plug at the remote end for engagement in the socket of another panel. Such an arrangement is illustrated diagrammatically in Figures 9–11, wherein Figure 9 shows three sections of the network and Figure 10 the arrangement of the corresponding transformers in the machine, whilst Figure 11 illustrates the manner in which the winding connections of Figure 10 are obtained through the three-pin plugs and sockets. By comparing Figures 9 and 10, it will be seen that the connections of the ratio windings correspond directly to the connections of the actual network sections, whilst the basis winding connections correspond reciprocally to the network section connections, the turns-ratio in each transformer corresponding, as indicated on the drawings, to the resistance in the corresponding network section. The four plug and socket connectors for each of the three panels are indicated on the drawings by the reference letters A, B, C, D with numerical suffixes appropriate to the panels. The three pins of each plug are asymmetrically arranged to ensure that the plug can only be inserted in one way into the socket. The middle terminals of the two lefthand sockets A B of a panel are connected together and to the lefthand end of the ratio winding, and the middle terminals of the righthand sockets C D are likewise connected to the righthand end of the ratio winding. The upper terminals of the upper sockets A C are both connected to the upper end of the basis winding, whose lower end is likewise connected to the lower terminals of the lower sockets B D. The lower terminal of socket A is connected to the upper terminal of socket B, and the lower terminal of socket C is connected to the upper terminal of socket D. The middle pin of the plug at one end of a flexible lead is connected to the middle pin of the plug at the other end of the lead, and (assuming the plugs are both the same way up, as when engaging in two righthand sockets, say $D_1$ and $C_3$, or two lefthand sockets, say $B_1$ and $A_3$) the upper pin of one plug is connected to the lower pin of the other and vice versa. When the flexible lead is used to connect a righthand socket to a lefthand socket, say $C_1$ to $A_2$, one of the plugs will be upside-down, so that in this position the two upper pins are connected together through the lead as also are the two lower pins. For the connections of the three panels shown, three flexible leads are required, namely $C_1A_2$, $B_1A_3$ and $D_1C_3$, in addition to the leads from $A_1$ and $C_2$ passing to the panels corresponding to the other parts of the network, and the socket $B_2D_2B_3D_3$ are not required. In order to complete the basis winding circuit, however, it is necessary to connect together the upper and lower terminals of each unused socket, and special two-pin short-circuiting plugs are employed for this purpose. With this arrangement the necessary connections can be built up for a network of any degree of complexity, the arrangement ensuring that, if the ratio winding connections directly correspond to the actual network connections, then the basis winding connections must reciprocally correspond to such connections. It is consequently only necessary for the operator, when setting up the calculator, to follow the ratio winding connections, and for this purpose a diagram of the ratio winding connections is preferably drawn on the control panel between the sockets. Figure 12 illustrates such diagrams for the three panels shown in Figures 9–11, and it will be clear that the operator must connect up his diagrams to make a miniature representation of the actual network.

It is however important to note that wrong connections can arise if the flexible leads are crossed over one another. This will be clear from a comparison of Figures 11 and 13, Figure 13 showing incorrect connections resulting from a cross-over. Thus it will be seen from Figure 13 that the basis winding is short-circuited through the sockets $A_2$ $B_2$ $D_1$ $B_1$ $A_3$ $C_3$ $C_1$ $D_1$ $B_2$. If the operator is careful to avoid any crossing-over of the flexible leads, such incorrect connections cannot arise, but it may be mentioned in passing that in certain circumstances two or more crossings-over can compensate one another so that the correct connections will in fact result. For the great majority of networks, it will be possible to build up all the required connections without a single cross-over, but some networks do exist in which one or more cross-over connections are unavoidable, and for this special panels must be provided. The mathematical conditions governing network arrangements, in which cross-over connections in a plane diagram are unavoidable, are known, but it is unnecessary to state such conditions here. The difficulty can however be completely obviated by the provision of a few special cross-over panels, which can be utilised, where required, in the machine, and which differ from the normal panel solely in the duplication of the basis winding, one basis winding being connected only to the lefthand sockets and the other only to the righthand sockets. Figure 14 illustrates by way of example, the arrangement of Figure 13 corrected by the inclusion of two cross-over panels in place of the normal panels, although in actual fact for the network in question the necessity for cross-over panels does not arise, since the connections shown in Figure 11 could be used with normal panels to produce exactly the same result.

When the machine is put into use in association with a particular network, the plugs are inserted in the panel sockets in such a manner that the ratio winding connections correspond directly to the actual network section connections, the basis windings thus being at the same time connected to correspond reciprocally with the network connections, and the numbers of turns of the windings are also set so that the turns-ratio on each panel is proportional to the ohmic resistance of the associated network section. A single-phase A. C. voltage is then applied to one (or more) of the windings in the machine or to a separate exciting winding on one of the transformers, or alternatively current is injected into one of the circuits, and as a result the various windings throughout the machine become energised in a manner which directly represents the current and voltage conditions in the associated network.

Whilst each panel may be provided with its own meters to give the readings desired, it will usually suffice to provide a single metering unit which is common to all the panels and can be plugged in to any panel for which meter readings are desired, each panel (in the case of potential transformer working) being provided with four terminal sockets connected respectively to the ends of the basis and ratio windings. The arrangement of the metering unit will depend on the nature of the measurements to be made, but in one convenient arrangement the unit consists of a group of transformers similar to those in the panels, each transformer having an adjustable ratio winding and a basis winding (with or without decimal tappings). The metering is preferably effected by a null-balance method, utilising a galvanometer or like instrument for indicating the condition of balance. Thus for measuring a network voltage or current in the case of potential transformer working, the meter plugs are inserted in the appropriate panel sockets (see Figure 15) and the voltage thus applied to the meter circuit is opposed by the voltage induced in the ratio winding on a metering transformer, whose basis winding is connected to the single-phase A. C. source, the galvanometer being connected in circuit with the two opposed voltages. The number of turns on the ratio winding is then varied by means of a tapping control switch until the galvanometer indicates a condition of balance. The desired reading is thus given by an indicator associated with the tapping control switch. For measuring power in the network (see Figure 16), the ratio winding of one metering transformer is first set to correspond to the appropriate voltage in the manner just described, and the basis winding on the transformer is connected through the meter plugs to the current socket terminals of the same panel, so that the voltage induced in the ratio of winding will represent the product of voltage and current. This induced voltage is measured by a null-balance comparison with the voltage induced in the ratio winding of a second metering transformer, whose basis winding is connected to the single-phase A. C. source, in a manner analogous to that described for voltage and current measurements.

Generally analogous metering arrangements are provided in the case of current transformer working, each panel in this case being provided with removable links in series with the two windings. In this case for measuring a network voltage or current, the connections from the metering unit are inserted in place of the corresponding link (see Figure 17) and the current thus supplied to the meter circuit is balanced against that induced in the basis winding on a metering transformer, whose ratio winding is connected to a suitable source of constant single-phase current. A sensitive vibration galvanometer is connected across the meter circuit (either directly or if necessary through an amplifier or transformer to increase its sensitivity) to indicate the condition of balance when the turns-ratio of the metering transformer has been appropriately adjusted, the desired reading being given by the indicator on the tapping control switch. For measuring power in the network (see Figure 18), one metering transformer is first set in this manner to correspond to the appropriate voltage, and its ratio winding is inserted in place of the link in the panel current circuit, so that the current induced in the basis winding will represent the product of voltage and current. This induced current is then measured by a null-balance comparison with that induced in the basis winding of a second metering transformer, whose ratio winding is connected to the constant current source.

The arrangement has been described with reference to a D. C. network built up of simple resistances, but it will be appreciated that it is equally applicable to an A. C. network built up of pure reactances and also to other analogous interconnected assemblies. It is also possible to represent generators in a D. C. network or capacities in a purely reactive A. C. network by the expedient of providing a reversing switch for the ratio winding on each panel, so that the generator is represented by the equivalent negative resistance or the capacity by a negative resistance. A power transformer with variable tappings can also be represented in the machine by the use of two panels, as indicated in Figures 19–22, wherein Figure 19 shows the network circuit and Figure 20 is a corresponding circuit utilising an auto-transformer in place of the ordinary transformer. Such an auto-transformer can be represented on the machine by two auto-transformers, one for the ratio windings giving a step-up of $n$ to 1 (assuming the network transformer gives this step-up), and the other for the basis windings giving a step-down of 1 to $n$, this being the reciprocal relation. Figure 21 shows a simple circuit diagram for the machine windings and Figure 22 illustrates how two of the standard panels can be utilised for the two auto-transformers with special interconnecting leads. By simultaneously varying the tappings on what would be the ratio windings of these two panels, a tap-change on the power transformer can be represented. The reversing switches provided for the ratio-windings can be used in this instance for converting a voltage boost into a voltage buck.

The arrangement so far described, employing two-circuit working, is capable of dealing with network and like calculations involving scalar quantities, but in the case of A. C. electrical networks and of other interconnected assemblies wherein planar vector quantities are involved, it will usually be necessary to arrange the calculating machine in such a manner as to enable such calculations as complex number multiplication to be carried out. The second arrangement employing four-circuit working, now to be described, is designed for this purpose, and will for convenience be described with reference to its use for measuring quantities associated with an A. C. electrical network.

Broadly speaking, this four-circuit calculator may be regarded as largely consisting of two superimposed two-circuit calculators, each having a ratio winding circuit with connections directly corresponding to the actual network connections and a basis winding circuit with connections reciprocally corresponding to the actual network connections, the two ratio winding circuits and the two basis winding circuits, although electrically independent, being magnetically interlinked at each panel. The voltages in the two ratio winding circuits (and similarly the currents in the two basis winding circuits) represent the in-phase and quadrature volts in the network and the voltages in the two basis winding circuits (or the currents in the two ratio winding circuits) represent the in-phase and quadrature currents in the network. It should be made clear however that all voltages (and similarly all currents) in the machine circuits are in phase with one another, so that for instance the voltages (or currents) representing the in-phase currents are in the same time phase with the voltages (or currents) representing the quadrature currents but are in an independent circuit.

In this four-circuit arrangement, as in the two circuit-arrangement above described, a separate panel is provided for each element or section of the network, but in this case each panel has two transformers, instead of a single transformer, with three windings on each transformer. Figures 23 and 24 show respectively a section of an A. C. network having non-inductive resistance R and reactance X, and the arrangement of the transformer windings in the corresponding panel of the calculating machine.

Thus using the notation of complex algebra, the impedance of the network section can be expressed as $(R+jX)$ and the voltage and current respectively as $(E+jE')$ and $(I+jI')$, where I and I' are the in-phase and quadrature components of the current E and E' are in the in-phase and quadrature components of the voltage in relation to some arbitrarily chosen vector of reference, these quantities being inter-related by the equation:

$$E+jE'=(I+jI')(R+jX)= \\ (RI-XI')+j(RI'+XI) \quad (10)$$

Equating the real and imaginary parts of the equation, we get:

$$\left. \begin{array}{l} E=RI-XI' \\ E'=RI'+XI \end{array} \right\} \quad (11)$$

In the calculating machine panel the first winding on the first transformer (which may be termed the "in-phase basis winding") and the first winding on the second transformer (the "quadrature basis winding") have the same number of turns $n$. The second windings on the two transformers have the same number of turns $nR$, bearing a ratio to the number of turns of the basis windings proportional to the non-inductive resistance R in the network section, and the third windings on the two transformers each have $nX$ turns, the turns-ratio with respect to the basis windings being proportional to the reactance X in the section. As shown in Figure 24 the third winding on the first transformer is connected in series with the second winding on the second transformer to constitute a group of windings which may be termed the "quadrature ratio winding group," whilst the second winding on the first transformer is connected in series with the reversed third winding on the second transformer to constitute the "in-phase ratio winding group." It will be clear at once from an inspection of Figure 24 that the voltages induced in these windings are interrelated by the equations:

$$\left. \begin{array}{l} V_E = RV_I - XV_I' \\ V_E' = RV_I' + XV_I \end{array} \right\} \quad (12)$$

Similarly the currents in the machine windings are interrelated by the equations:

$$\left. \begin{array}{l} C_E = RC_I - XC_I' \\ C_E' = RV_I' + XV_I \end{array} \right\} \quad (13)$$

A comparison of Equations 11, 12 and 13 shows that the induced voltages $V_E V_E' V_I V_I'$ or similarly the currents $C_E C_E' C_I C_I'$ can be taken as measures of the in-phase and quadrature voltages and currents in the network, and it will be clear that the transformer arrangement enables calculations involving complex number multiplication to be carried out, provided that the four induced voltages or currents are confined to independent circuits. It is, of course, well known that in an A. C. network, the laws relating to current balance at a star-point and to voltage balance around a closed mesh apply independently to the in-phase and quadrature resolved components of the currents and voltages, and it follows therefore that correct calculations will be made by inter-connecting the four-circuit panels with one another in a manner analogous to that above described for the two-circuit panels, the two ratio winding circuits having connections directly corresponding to the network connections, whilst the two basis winding circuits have connections reciprocally corresponding to the network connections, the four circuits being kept independent of one another.

For effecting the necessary connections between panels six-pin plugs with six-wire connecting leads are used, there being four six-terminal sockets for each panel, as indicated in Figure 25, the arrangement being generally analogous to that described for two-circuit working. Thus all four independent circuits are simultaneously connected up in the correct manner. Exactly analogous conditions apply in four-circuit working as in two-circuit working in relation to crossover connections and special cross-over panels (with the basis winding on each transformer duplicated) are employed where necessary.

The second and third windings on the two transformers are adjustable in a manner analogous to that above described for the ratio windings in the two-circuit arrangement, a single tapping control switch being used to effect similar and simultaneous adjustment of the two second windings, whilst another such switch simultaneously controls the two third windings. The two basis windings are preferably provided with tappings to give decimal switching under the control of a single tapping control switch.

It will be appreciated that the terms "in-phase" and "quadrature" above used are purely relative terms and indicate the resolved components of the quantities concerned with respect to some fixed vector of reference. The position of the reference vector depends on the manner in which the exciting voltage is applied to the circuits (in the case of potential transformer working). Thus there may be two independent exciting voltages, one applied to a part of the in-phase ratio winding circuit (or the in-phase basis winding circuit) and the other to a part of the quadrature ratio winding circuit (or the quadrature basis winding circuit), and the position of the reference vector then depends on the relative magnitudes of the two exciting voltages. By making one exciting voltage zero (i. e. a short-circuit), say that applied to the quadrature ratio winding circuit, then the applied voltage becomes the reference vector, the various components being all measured with respect to the phase of the applied voltage. By suitable adjustment and with suitable application of the exciting voltage, it is possible to bring the quadrature voltage on any panel to zero, and the in-phase voltage measured on that panel will then represent the total voltage in the associated section, whilst the in-phase and quadrature currents will respectively represent the load current and the wattless current. In practice, however, this will usually be inconvenient, and it will suffice to measure the four components E, E', I, I' and to obtain the various quantities required from these components, bearing in mind that the total current is represented by $\sqrt{I^2+I'^2}$, the total voltage by $\sqrt{E^2+E'^2}$, the total active volt-amperes by $(EI+E'I')$, the total reactive volt-amperes by $(EI'-E'I)$ etc.

The metering unit is preferably arranged so that a direct indication of the more important of such quantities can be obtained without additional calculation. It will suffice to describe the arrangement of the metering unit for the case when the machine transformers are utilised as potential transformers, a generally analogous arrangement being employed when the transformers are utilised as current transformers. Thus each panel is provided with eight terminal sockets connected to the ends of the windings and winding groups, so that measurement of any of the four components E, E', I, I' can be made directly in the manner described above with reference to Figure 15. By using the method described with reference to Figure 16 for measuring a simple product of two of these components (or similarly the square of one component) a variety of expressions involving such products or squares can be evaluated. Thus, for instance, for measuring total voltage (see Figure 26) a group of four metering transformers will suffice. The ratio windings of two of these transformers are first set in the manner described with reference to Figure 15 to correspond respectively to the in-phase and quadrature voltages E and E' and the basis windings of these transformers are connected to the terminal sockets associated with these two voltages, so that the voltages induced in the ratio windings will correspond to the squares of the two voltages $E^2$ and $E'^2$. These two ratio windings are connected in series with one another so that the sum of the induced voltages is opposed in the galvanometer circuit to the voltage induced in the ratio winding of the third transformer. The basis winding of the third transformer is connected to the ratio winding of the fourth transformer, whose basis winding is connected to the A. C. source, and the ratio windings of the third and fourth transformers are similarly and simultaneously adjusted until the galvanometer indicates the condition of balance. Thus the voltage induced in the ratio winding of the third transformer corresponds to the square of that induced in the ratio winding of the fourth transformer, and since this voltage is balanced against a voltage representing $(E^2+E'^2)$, it will be clear that the indicator on the tapping switch controlling the ratio windings of the third and fourth transformers will indicate the total voltage $\sqrt{E^2+E'^2}$. The total current can be measured in an analogous manner.

Figure 27:
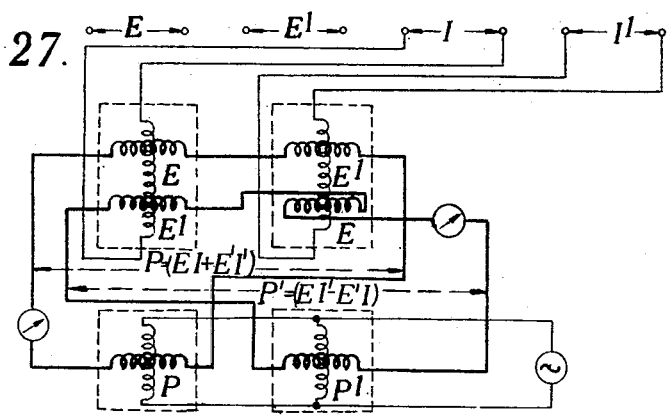

It will be clear that such quantities as the total active volt-amperes $P(=EI+E'I')$ and the total reactive volt-amperes $P'(=EI'-E'I)$ can be measured in a generally similar manner with the use of three transformers, the fourth transformer being unnecessary since a square root is not required, but it will usually be preferable to make these two measurements simultaneously, and this can readily be effected by the use of two galvanometers and four transformers, two of which each have one basis winding and two ratio windings. Such an arrangement is shown in Figure 27. To effect the desired measurements, the first ratio windings of these two transformers are first of all set to correspond respectively to E and E' and the second ratio windings are then each adjusted to the same setting as the first winding on the other transformer, so that each transformer has its two windings set to correspond to E and to E'. The basis windings of these two transformers are then plugged in to the appropriate current terminals, and the ratio windings are then connected in pairs in series with one another, in one case with one winding reversed, so that the voltages obtained in the two circuits correspond respectively to $P(=EI+E'I')$ and $P'(=EI'-E'I)$, these voltages being balanced in the galvanometer circuits respectively against those induced in the ratio windings of the third and fourth transformers, whose basis windings are both connected to the A. C. source.

After making the measurements of P and P' in this manner, it is possible by the use of three further transformers, as indicated in Figure 28, to measure the total volt-amperes $\sqrt{P^2+P'^2}$ and the power factor $P/\sqrt{P^2+P'^2}$. Thus with the ratio windings of the third and fourth transformers set to correspond to P and P' and connected in series, and with the basis windings of these transformers energised from the voltages corresponding to P and P' obtained from the series-connected windings of the first and second transformers, it is possible by means of the fifth and sixth transformers to measure $\sqrt{P^2+P'^2}$ in a manner analogous to that described for Figure 26. For measuring power factor the voltage corresponding to P is opposed in a galvanometer circuit to that induced in the ratio winding of the seventh transformer, whose basis winding is energised from the voltage corresponding to $\sqrt{P^2+P'^2}$ obtained from the sixth transformer.

A simpler and more convenient method of measuring the total voltage $(E+jE')$ or the total current $(I+jI')$ is illustrated in Figure 29. In this arrangement a non-inductive resistance $r$ and a capacity $-x$, whose absolute magnitudes are equivalent to one another at the a. c. frequency employed, are connected in series with one another across the in-phase voltage (or current) terminals, and similar resistance and capacity are connected across the quadrature voltage (or current) terminals, the two circuits be connected together as shown. The mid-points of the two circuits (i. e. the junction between the resistance and the capacity) are respectively connected to a pair of metering terminals, and the voltage across these terminals is then proportional to the desired total voltage (or total current). For this voltage is made up of two parts respectively equal to $$\left(\frac{r}{r-jx}E\right) \text{ and } -\left(\frac{-jx}{r-jx}E'\right)$$

so that the voltage is $$\left(\frac{rE+jxE'}{r-jx}\right)$$

and since $r=x$, the voltage is proportional to $$\sqrt{E^2+E'^2}$$

It will be appreciated that, instead of directly measuring the machine voltages representing the network quantities or their components, these may be applied to the plates of a cathode ray tube, so that a graphic representation is obtained on the screen of the tube. Thus for example, as diagrammatically indicated in Figure 30, the in-phase voltage (or current) terminals may be connected through an amplifier to one pair of plates of the cathode ray tube for deflecting the beam in one direction (say, vertically) on the screen, whilst the quadrature voltage (or current) terminals are similarly connected to the other pair of plates for deflection in the (horizontal) direction at right angles on the screen, so that the resultant image on the screen will directly correspond to the planar vector representing the voltage (or current).

By the use of a further feature of the invention, which may be referred to as a static commutator, it becomes possible to show two planar vectors (for example the voltage vector and the current vector) simultaneously on the cathode ray tube screen. Before describing how this is done, it will be well to explain the underlying principles of this static commutator. Figure 31 illustrates a simple circuit in which a variable voltage V applied to terminals A B supplies a load Z through a resistance $R_c$ and through a rectifier D, which is such as to permit current to flow when the terminal A is negative and the terminal B positive. A control voltage $V_c$ is applied to terminals $C_1 C_2$ connected across the resistance $R_c$ through a control rectifier $D_c$ (which may alternatively be put in the dotted position $D'_c$), so that no voltage from the control source will build up across $R_c$ unless the terminal $C_1$ is negative and the terminal $C_2$ is positive, and even then only if the control voltage $V_c$ is greater than the voltage drop across $R_c$. If the control voltage $V_c$ is in the correct sense and is equal to or greater than the voltage V, then the voltage across the load Z will be zero. If the two rectifiers are reversed, analogous conditions will apply, and again the voltage across Z will be zero, when the control voltage $V_c$ is in the correct sense and is greater than the voltage V. Figure 32 shows such a reversed circuit combined with the circuit of Figure 31, with equal and opposite control voltages applied to the two circuits, $V_c$ being assumed to be at all times greater than V. So long as $V_c$ is positive no current will flow to the load Z through either of the rectifiers $D_1$ and $D_2$, whilst when $V_c$ is negative no current will flow through either of the control rectifiers $D_{c1}$ and $D_{c2}$, current then passing to the load either through $D_1$ when the terminal A is negative or through $D_2$ when the terminal A is positive. The two circuits are similar to one another, the two resistances $R_c$ being equal to one another and being chosen sufficiently large to avoid waste of power in the control circuits, this in turn involving loss of power in the main circuit so that the arrangement is applicable rather to the control of signal circuits than power circuits. The arrangement of Figure 32 necessitates two separate sources of control voltage, but this can be avoided by using the equivalent arrangement shown in Figure 33.

If $V_c$ is an alternating voltage, the circuit of Figure 33 allows current to flow through the load Z during the negative half cycle of $V_c$ but (provided $V_c$ is always greater than V) completely interrupts the current during the positive half cycle. This makes it possible, by duplicating the circuit of Figure 33 with the control voltage $V_c$ applied in opposite senses to the two parts and by connecting the two parts to the same load Z, to apply two different voltages $V_1$ and $V_2$ alternately to the load, one voltage being cut out altogether while the other is being applied to the load. Figure 34 illustrates the application of such an arrangement to the cathode ray tube arrangement of Figure 30, whereby the current and voltage planar vectors will appear simultaneously on the screen, the two vectors in fact being produced during alternate half-cycles of the control voltage.

It should be understood that the calculating machine with four-circuit working is operated on a single-phase basis, but the calculations can easily be applied to three-phase networks operating under symmetrical conditions. For asymmetrical three-phase conditions a twelve-circuit calculator can be used, or alternatively the problem can be analysed by the method of symmetrical components, the final result being derived from separate calculations made for the positive, negative and zero phase-sequence components.

In the description of the four-circuit arrangement, it has been assumed that each element of the network can be represented by a resistance and a reactance in series. It will be appreciated that inductance and capacity can respectively be treated as positive and negative reactances, and the necessary connections can be obtained by the use of the reversing switches, where required. An inductive load can be represented by a resistance and a reactance, and a generator can be represented by a negative resistance and a negative reactance, the ratio of resistance to reactance in each case depending on the power factor.

Again the circuit arrangement of Figure 25 can be modified, if desired to operate on the basis of conductance G and susceptance B in place of non-inductive resistance R and inductance X, in accordance with the equation $$I+jI'=(E+jE')(G+jB) \qquad (14)$$

Figure 35 shows the circuits for this purpose.

Where resonance effects are likely to be encountered care must be taken in applying the exciting voltage. Thus in the case of capacities and inductances in series, the exciting voltage should be applied to the basis winding circuits, whilst in the case of capacities and inductances in parallel the ratio winding circuits should be used.

Where only one generating station is supplying the network, there will usually be no need to provide a special panel on the machine for the station, and for many calculations only the equivalent resistance and reactance of the generator need be brought into account, all stations being represented by feeds from a common busbar through the appropriate windings corresponding to such resistance and reactance. For networks fed from a number of generators, where questions of voltage regulation and transfer of load and wattless current are being investigated, all the generating stations except one (namely the regulating station) can be represented in the machine by the negative resistances and reactances equivalent to their loading. The voltages or currents in the four independent circuits at the position which the panel corresponding to the regulating station would occupy, represent the answer to the problem. It will be obvious that if a panel were included for the regulating station and were incorrectly adjusted (as it would have to be before the answer is known) a large circulating current would be set up which might cause damage to the machine. By suitable adjustment of the windings representing the equivalent resistance and reactance of each generating station, it is possible to trace through the network the effects of voltage regulation and governor adjustment. When a panel representing a generating station has been set, the power factor on the station is fixed and the total volt-amperes supplied from the station is also practically fixed, since it is proportional to the voltage which will not vary much.

Similar conditions apply to panels representing static or synchronous condensers. In some problems of system stability, it is necessary to take account of synchronous plant arranged to take a greater leading current with falling voltage. Such variations along with the variation of load power factors with voltage must be treated by a step-by-step method in the machine.

Problems involving variation of frequency, such as the design of filter circuits, must also be treated by step-by-step methods, by increasing all positive reactances and decreasing all negative reactances by a small fixed percentage at each step.

Long transmission lines having distributed resistance, inductance and capacity can be dealt with by considering them as made up of a number of sections, each with the appropriate proportion of each quantity.

The question of tapped transformers can be dealt with in four-circuit working in a manner analogous to that described above with reference to Figures 19-22 for two-circuit working, four transformers being used instead of two. Provision may also be made in the machine for dealing with such equipment as phase-shifting transformers and induction regulators, by treating the in-phase voltage boost and the quadrature voltage boost separately by means of two adjustable windings on each of the four transformers used, as indicated in Figure 36. Thus if $a$ is the percentage in-phase voltage boost and $b$ is the percentage quadrature voltage boost, then the input voltages and currents $E_i E_i' I_i I_i'$ and the output voltages and currents $E_o E_o' I_o I_o'$ are connected by the equations:

$$E_o + jE_o' = (E_i + jE_i')\left(1 + \frac{a}{100} + j\frac{b}{100}\right)$$
$$I_i + jI_i' = (I_o + jI_o')\left(1 + \frac{a}{100} + j\frac{b}{100}\right) \qquad (15)$$

Equating the real and imaginary parts of these equations, we get:

$$E_o = E_i\left(1 + \frac{a}{100}\right) - E_i'\left(\frac{b}{100}\right)$$
$$E_o' = E_i'\left(1 + \frac{a}{100}\right) + E_i\left(\frac{b}{100}\right)$$
$$I_i = I_o\left(1 + \frac{a}{100}\right) - I_o'\left(\frac{b}{100}\right)$$
$$I_i' = I_o'\left(1 + \frac{a}{100}\right) + I_o\left(\frac{b}{100}\right) \qquad (16)$$

It will be clear that these conditions are satisfied by the connections shown in Figure 36, which uses two standard four-circuit panels with a special system of connecting cords. If the fixed windings have 1000 turns and the pairs of adjustable windings $10a$ and $10b$ turns, each voltage boost can be varied in steps from 0.1% to 100%.

In the foregoing description it has been assumed that the transformers operate without magnetising current or other errors. In practice, such errors can usually be kept within narrow limits by suitable design of the transformers, except in cases where an adjustable winding should be connected in circuit with only a single turn or very few turns. In such cases the magnetising current errors are cumulative and may assume large proportions. The difficulty can be to some extent obviated by suitable grading the windings and by the decimal tapping arrangement for the fixed or basis windings above mentioned, and also by applying the exciting voltage at several points in the circuits. Such expedients, however, may not in all cases be sufficient and it may be necessary to provide a compensating arrangement which can be applied when required to any transformer or alternatively to provide automatic compensation for each transformer.

Such automatic compensation can be obtained, as shown in Figure 37, by providing an additional compensating transformer T for each transformer in the machine, interconnected with an additional winding W on the machine transformer, and applying a voltage therefrom to the grid of a thermionic valve amplifier, whose output is applied to the machine transformer through a further auxiliary transformer $T^1$, the output current from which is arranged to be out of phase with the voltage applied to the grid to the correct extent to provide compensation for the drop in the valve and the various transformer windings. This phase-shift is obtained by means of a variable capacity C, or more conveniently by a fixed condenser of slightly less than the proper value in conjunction with a small variable resistance R. With a suitable amplification ratio, this arrangement enables the magnetising current errors to be reduced to very small proportions.

Although described primarily with reference to the evaluation of quantities associated with electrical networks, the invention is also applicable to calculations associated with other forms of interconnected assemblies. As an example may be mentioned the application of the invention to calculations associated with pin-jointed structural frameworks with redundant bars, i. e. with more bars than are necessary to secure stiffness. It is necessary to take into account the elasticity of the bars. The resolved components $\delta x$, $\delta y$, $\delta z$ of the displacement of one end of a bar relative to the other end are each made up of two parts, namely $(\delta x)_1$ $(\delta y)_1$ $(\delta z)_1$ due to the elasticity of the bar and $(\delta x)_2$ $(\delta y)_2$ $(\delta z)_2$ due to the pivotal movement of the bar about the pin joint at the reference end. If $a$ is the elasticity of the bar expressed as the extension under unit force and $Px$ $Py$ $Pz$ are the resolved components of the stress in the bar, these quantities are connected together by the equations:

$$(\delta x)_1 = a\ Px$$
$$(\delta y)_1 = a\ Py \qquad (17)$$
$$(\delta z)_1 = a\ Pz$$

and $$l(\delta x)_2 + m(\delta y)_2 + n(\delta z)_2 = 0 \qquad (18)$$

These conditions are satisfied by the arrangement shown in Figure 38, illustrating one panel of the machine, this panel including four transformers, two of which have four windings each whilst the other two have two windings each. On the first transformer (shown at the left-hand end of the lower row on the drawing) the three ratio windings have turns ratios to the basis winding corresponding to the direction cosines $l\ m\ n$ of the bar. On the second transformer (shown at the top) three of the windings have the same numbers of turns respectively as the three ratio windings on the first transformer, whilst the fourth winding is directly connected to the basis winding on the first transformer and has a turns ratio relative thereto corresponding to the coefficient of elasticity $a$. The windings on the third and fourth transformers are connected in series (in the forward or reverse sense) with the ratio windings of the first transformer in the manner shown in the drawing and have the same numbers of turns as certain of these windings, as indicated in the drawing. The three windings, drawn vertically, in the second transformer are connected to the corresponding windings of the other panels in a manner corresponding reciprocally to the framework connections, the voltages in these windings corresponding to the resolved components of the total stress in the bar. The connection between the first and second transformers ensures that the voltages in the three adjustable windings of the first transformer represent $(\delta x)_1$ $(\delta y)_1$ and $(\delta z)_1$ in accordance with Equations 17, and the voltages across the windings of the third and fourth transformers in the three circuits also represent $(\delta x)_2$ $(\delta y)_2$ and $(\delta z)_2$, the third and fourth transformers together corresponding to Equation 18. The three winding groups on the first, third and fourth transformers in the three circuits thus represent $\delta x$, $\delta y$ and $\delta z$, the resolved components of the total extensions, and these winding groups are respectively connected to the corresponding winding groups of the other panels in a manner directly representing the framework connections. The various connections between the panels in the six circuits are simultaneously made by means of suitable plugs and sockets and the adjustment of windings in a panel having the same numbers of turns is effected simultaneously by a common tapping control switch.

It will be appreciated from these examples that the invention can be readily applied to interconnected assemblies of various kinds, the calculating machine including two or more independent circuits, of which at least one has connections corresponding directly to the actual connections of the assembly elements, whilst at least one other has connections corresponding reciprocally to the actual assembly connections. Whilst in most instances all the independent circuits will have either direct or reciprocal connections in this manner, it will in some instances be desirable for one or more of the circuits to be connected up in some other manner as for example in a simple series or parallel connection.

Figures 39–44 illustrate a practical construction of calculating machine according to the invention more especially designed for performing calculations associated with electrical networks. This construction is such that it can be employed at will either for two-circuit working or for four-circuit working.

In this construction the machine comprises a supporting framework 10, part of which is shown in Figure 39, having a number of shelves arranged in columns and rows with an opening in the front wall of the framework in front of each shelf. Each shelf serves for the reception of one unit, which can slide in from the back of the machine, so that the front panel 20 of the unit is visible through the corresponding opening in the front wall of the framework. The number of units provided will depend on the number of network sections likely to be dealt with in the calculations, so that a machine having, say, six rows with eight units in each row can be employed for calculations for any network having not more than forty-eight sections. The units are for the most part similar to one another, but it is usually desirable to provide a few special units for dealing with special problems. Thus of the eight units shown in Figure 39, the top four are ordinary standard units, the third row contains two units designed for dealing with crossover difficulties (as referred to above in connection with Figures 13 and 14), and the fourth row contains two units which can be operated on the basis of conductance and susceptance (as described above with reference to Figure 35). These special units are all usable as ordinary standard units, the cross-over units in the third row each being provided with a socket marked X into which a short-circuiting plug can be inserted, the arrangement being such that when this plug is in the unit operates exactly as a standard unit. Similarly the units in the fourth row are each provided with two rotary switches, one of which bears an erect letter R and an inverted letter B and the other an erect letter X and an inverted letter G, the arrangement being such that in the position shown the units operate exactly as standard units, whilst when the switches are rotated to make the letters B and G erect, the internal circuit connections are changed to suit operation on the basis of conductance and susceptance. The descriptions already given in connection with Figures 14 and 35, in conjunction with the following description of the standard unit will serve to make clear the arrangement of these special units.

Each unit contains two transformers, each having a basis winding and two ratio windings, which can (as will be described with reference to Figure 40) be connected up either in the manner shown in Figure 25 for four-circuit working or in the manner shown in Figure 11 to form two units for two-circuit working (one of the ratio windings on each transformer being disconnected in the latter case).

The front panel 20 of each unit carries two rotary knobs 21 for controlling the decimal tappings respectively on the two basis windings and also for reversing the connections of the ratio windings, as will be described in detail with reference to Figures 40 and 43. These knobs 21 have small windows 22 adjacent to them through which an indication of the tapping and reversing positions of the knobs is given. Six further rotary knobs 23 are provided for controlling the tappings on the ratio windings, the three in the upper row controlling hundreds, tens and units tappings for the two "resistance" windings, one on each transformer, whilst the three in the lower row control hundreds, tens and units tappings for the two "reactance" windings. Windows 24 adjacent to these knobs give a visual indication of the tapping position.

The panel 20 is also provided with eight "three-pin" sockets 31–38, four at each end, in any or all of which three-pin plugs 30 can be inserted. These plugs and sockets are employed for two-circuit working, the sockets 31–34 constituting the four sockets of one two-circuit unit, whilst the sockets 35–38 correspond to the other two-circuit unit. It may be mentioned here that in two-circuit working, the sockets 31–34 are used in association with the upper row of knobs 21, 23 and the sockets 35–38 with the lower row of knobs 21, 23. A few plugs 30 are shown in position in the sockets in Figure 39 by way of example, with their three-wire interconnecting cords 39.

The panel 20 also has five eight-contact sockets 40, respectively lettered A B C D M. The first four A B C D are used for the inter-unit connections and the fifth M for metering in four-circuit working. Six only of the eight contacts of the sockets A B C D are used for the interconnections, the cooperating plugs 41 (some of which are shown in position in Figure 39 with their six-wire interconnecting cords 42) having a short-circuiting connection between the remaining two contacts. All eight contacts are however used in the metering socket M, the cooperating plug 41 (to which an eight-wire cord 43 is connected) being identical with the other plugs except for the absence of the short-circuiting connection. The use of eight-contact sockets in all five positions has the advantage that standard plugs and sockets can be used throughout and also facilitates the internal circuit arrangements for conversion from four-circuit to two-circuit working. The upper two sockets A C are also used for two-circuit metering, four of the contacts only being used in this case. The plug 41 is in this case employed with a four-wire cord 44 connected thereto, and has four of its contacts left disconnected. In two-circuit working the metering socket A is associated with the three-pin sockets 31–34 and the metering socket C with the three-pin sockets 35–38.

The construction of the eight-contact plugs and sockets is shown in Figures 41 and 42. The socket 40 consists of a body of insulating material, which can be secured to the back of the panel 20 behind a circular opening therein and has a generally cylindrical recess 45 behind the opening. Eight slots 46 are cut in the wall of this recess at uneven spacings, and each slot houses a spring contact tangue 47, to which a connection leads through the wall of the recess. The cooperating plug 41 has eight contact strips 48 spaced around its end face to correspond with the spacings of the socket contact tongues 47, and projecting slightly beyond the edge of the end face so as to fit into the slots 46 in tight engagement with the tongues 47 when the insulating body of the plug is fitted into the socket recess 45. The connections to the contact strips 48 are taken through the body of the plug to make connection in the wellknown manner with the wires of the interconnecting cord 42 (or 43 or 44). The uneven spacings of the contacts ensure that the plug can only be inserted the right way up in its socket.

The arrangement of the electrical circuits in the unit is shown diagrammatically in Figure 40, wherein the windings of the first transformer are indicated at 50, 51, 52 and those of the second at 55, 56, 57. The windings 50, 55 are the basis windings, the windings 51, 56 are the "resistance" ratio windings, and the windings 52, 57 are the "reactance" ratio windings. The two reversing switches controlled respectively by the two knobs 21 are diagrammatically shown at 60 and 65, the actual construction of these switches being indicated in Figure 44 to be described later. These reversing switches are indicated in their normal position in Figure 40. For convenience of description the contacts in each eight-contact socket are numbered 1–8 and these contacts will be referred to as $A_1$ $A_2$ $B_1$ $C_1$ $M_1$ etc. It will be remembered that in use in four-circuit working two of the contacts of each of the sockets A B C D are short-circuited by a connection in the cooperating plug, this connection being indicated by a dotted line in the drawing between contacts 2 and 3. It may here be mentioned that the contacts $B_2$ $B_3$ $D_2$ $D_3$ are completely disconnected and serve no useful purpose.

Taking first of all four-circuit working, it will be clear from tracing out the individual circuits that the various transformer windings are connected up exactly in the manner indicated in Figure 25. Thus the upper end of the basis winding 50 of the first transformer is connected to the contacts $A_6$ and $C_4$ and is also connected to the metering contacts $M_6$, whilst the lower end of the same winding is connected to the contacts $B_4$ and $D_6$ and to the metering contact $M_4$, so that the two metering contacts $M_6$ $M_4$ constitute the terminals for measuring the in-phase current component. Similarly the upper end of the basis winding 55 of the second transformer is connected to the contacts $A_7$ and $C_1$ and to the metering contact $M_7$, whilst the lower end thereof is connected to the contacts $B_1$ and $D_7$ and to the metering contact $M_1$, the contacts $M_7$ $M_1$ constituting the metering terminals for the quadrature current component.

The lefthand end of the resistance ratio winding 51 of the first transformer is connected through the reversing switch 60 to the contacts $A_5$ and $B_5$ and to the metering contact $M_5$, and its righthand end is connected through the reversing switch 60 to the contacts $A_3$ and $C_2$ and thence through the plug short-circuiting connections to the contacts $A_2$ and $C_3$, from which a connection leads through the reversing switch 65 to the right-hand end of the reactance ratio winding 57 of the second transformer, whose lefthand end is connected through the reversing switch 65 to the contacts C₅ and D₅ and to the metering contact M₃. Thus the winding 51 is in series with the reversed winding 57 and the metering contacts M₅ M₃ constitute the terminals for measuring the in-phase voltage component.

The lefthand end of the resistance ratio winding 56 of the second transformer is connected through the reversing switch 60 to the contacts A₈ B₈ and the metering contact M₂, and the righthand end of this winding is connected through both reversing switches 60, 65 to the lefthand end of the reactance ratio winding 52 of the first transformer, whose righthand end is connected through the reversing switch 65 to the contacts C₈ D₈ and the metering contact M₂. Thus these two windings are connected in series and the metering contacts M₈ M₂ constitute the terminals for measuring the quadrature voltage component.

The remaining contacts of the sockets A B C D are connected together in pairs (A₁ B₇, A₄ B₆, C₇ D₁, C₆ D₄) to complete the independent circuits made through the interconnecting cords, and it will be remembered that, if only one pair of sockets A B is in use for inter-unit connections, a short-circuiting plug must be inserted in each of the other two sockets B and D. This plug is like the other plugs except that it has no cord connected to it, but has instead internal short-circuiting connections respectively connecting contacts B₁ B₇ or D₁ D₇, B₄ B₆ or D₄ D₆, and B₂ B₃ or D₂ D₃.

It will be clear from the description of circuits above given that operation of the reversing switch 60 will reverse the connections of both resistance ratio windings 51 and 56, while operation of the other reversing switch 65 will similarly reverse both reactance ratio windings 52 and 57, thus enabling "negative resistance" or "negative reactance" to be represented in the machine.

Turning now to two-circuit working, it must first be pointed out that the windings 52 and 56 are completely disconnected from the three-pin sockets 31–38 and serve no useful purpose in two-circuit working. The complete unit forms itself into two separate two-circuit units, of which the first has the windings 50 and 51 as its basis and ratio windings and utilises the sockets 31, 32, 33, 34 and the reversing switch 60, whilst the second includes the basis winding 55, the ratio winding 57, the sockets 35, 36, 37, 38, and the reversing switch 65. For metering purposes the socket A is used for the first unit and the socket C for the second unit, the metering socket M not being employed at all, but it is necessary for the short-circuiting plugs to be inserted in the sockets B and D.

The actual circuits are similar to those shown in Figure 11. Thus in the first unit, the upper end of the basis winding 50 is connected to the upper contacts of the sockets 31 and 32 and to the metering contact A₆, whilst the lower end of this winding is connected to the lower contacts of the sockets 32 and 34 and to the metering contact A₄, the latter connection passing through the contacts B₄ B₆ and the internal connection in the short-circuiting plug. Thus contacts A₆ A₄ constitute the current metering terminals.

The lefthand end of the ratio winding 51 is connected through the reversing switch 60 to the middle contacts of the sockets 31, 32 and to the metering contact A₅, whilst its righthand end is connected through the reversing switch 60 to the middle contacts of the sockets 33, 34 and to the metering contact A₃, contacts A₅ A₃ thus constituting the voltage metering terminals. It should be mentioned that the metering plug used for two-circuit working uses only the four contacts A₃ A₄ A₅ A₆ and the short-circuiting connection between contacts A₂ A₃ is not provided. The reversing switch 60 will act when operated to reverse the ratio winding connections.

In the second unit, the upper end of the basis winding 55 is connected to the upper contacts of sockets 35, 37 and the metering contact C₁, whilst its lower end is connected to the lower contacts of sockets 36, 38 and (through the short-circuiting plug connection between contacts D₁ D₇) to the metering contact C₇, contacts C₁ C₇ thus constituting the current metering terminals.

The lefthand end of the ratio winding 57 is connected through the reversing switch 65 to the middle contacts of sockets 35, 36 and the metering contact C₅, whilst the righthand end is connected through the reversing switch 65 to the middle contacts of sockets 37, 38 and the metering contact C₃, contacts C₅ C₃ constituting the voltage metering terminals. The reversing switch 65 will act when operated to reverse the ratio winding connections.

The three-pin plugs with their three-wire cords are inserted as required into the sockets 31–38 in the manner already described with reference to Figure 11, all unused sockets being filled with short-circuiting plugs, which are like the other plugs except that they have no cords but have a short-circuiting connection between the upper and lower contacts.

The manner in which the tapping control knobs 23 control the tappings of the ratio windings is indicated in Figure 43, which shows one of the tapping switches only, say that controlling the units digit for the resistance ratio windings 51, 56, the other tapping switches being similar except for the tapping points on the windings themselves. As has been mentioned above the tapping switches give a range of tappings from zero to 999 and the function of the units tapping switch shown is to give a range from zero to 9. This is done by providing four single-turn partial windings 71, 72, 73, 74 connected in series with intermediate and end tapping leads respectively passing to five contact studs 76, and also a five-turn partial winding 75 with its ends respectively connected to two concentric contact segments 77, an exactly similar set of connections being provided for each of the two ratio windings 51, 56. Two rotary wipers 78 cooperate respectively with the two segments 77 for both windings, and are respectively connected to two further wipers 79 cooperating with the contact studs 76 for both windings. The four wipers are rotated together under the control of the knob 23 through ten positions, and it will be at once clear from an examination of the connections that the ten positions give the desired tapping range from zero to nine simultaneously for both windings. The tends and hundreds tapping switches are similar except that the one-turn and five-turn partial windings are replaced by ten-turn and fifty-turn partial windings or by a hundred-turn or five-hundred-turn partial windings as the case may be, the complete set of partial windings being connected in series to make up the full winding in each case.

Figure 44 indicates diagrammatically the practical construction of the reversing switches and the basis winding tapping control switches controlled by the knobs 21. The two reversing switches 60, 65 are shown on the righthand side of the drawing and the corresponding tapping control switches 80, 85 on the lefthand side. Each tapping control switch 80 or 85 comprises two sets of three contact studs 81, 82 or 86, 87, one stud of each set being connected to a ten-turn tapping point on the basis winding 50 or 55, whilst the second of each set is connected to a hundred-turn tapping point thereof and the third of each set to the end of the winding giving a thousand turns. A rotary wiper 83 or 88 cooperates with these studs and in its various positions connects them to a contact segment 84 or 89, the arrangement being such that each 90° movement of the wiper includes the three alternative decimal tapping positions.

Each reversing switch 60 or 65 includes an inner ring of four contact segments 61 or 66, an outer ring of four contact segments 62 or 67 and a group of four wipers 63 or 68, each of which connects one inner segment to one outer segment. The four segments 62 of the outer ring of the first reversing switch 60 are connected to the two resistance ratio windings 51, 56 and the corresponding segments 67 of the other reversing switch 65 are connected to the two reactance ratio windings 52, 57, whilst the inner ring segments of both switches are connected up in the manner shown in Figure 40. The four wipers 63 are rotated together with the wiper 83 under the control of one knob 21, and the four wipers 68 and the wiper 88 are likewise rotated together under the control of the other knob 21. The relative spacing of the various contact studs and segments is such that no change is made in the reversing switch contact connections while the associated tapping control switch wiper is moving from one stud to another in the same set of three, but that the reversing switch connections do change over when the associated tapping control wiper moves from one set of studs to the other. It is thus possible to have any desired basis winding tapping with either the forward or the reverse connection of the ratio windings.

What I claim as my invention and desire to secure by Letters Patent is:

1. In a machine for electrically evaluating quantities associated with an interconnected assembly of the kind in which each element of the assembly has associated with it certain fixed and variable quantities which are inter-related by one or more equations, such equations being of a like nature for all the elements of the assembly, whilst the variable quantities of a like character for the various elements of the assembly are also inter-related by one or more equations, the combination of a number of units one for each element of the assembly each unit comprising a plurality of magnetically interlinked windings whose turns-ratios represent the values of fixed quantities associated with the element, means for connecting each winding of a unit to the corresponding windings of the other units in an independent circuit individual to the variable quantities of one character in the assembly the connections of at least one of such independent circuits corresponding directly to the actual connections of the elements of the assembly whilst those of at least one other independent circuit correspond reciprocally to the actual connections of the assembly elements, an A. C. source of energy, and means for energising at least one of the windings from such source.

2. In a machine for electrically evaluating quantities associated with an interconnected assembly of the kind in which each element of the assembly has associated with it certain fixed and variable quantities which are inter-related by one or more equations, such equations being of a like nature for all the elements of the assembly, whilst the variable quantities of a like character for the various elements of the assembly are also inter-related by one or more equations, the combination of a number of units one for each element of the assembly, each unit comprising a transformer having two windings and means for adjusting the number of effective turns of at least one of the windings to enable the turns-ratio to be set to represent the value of a fixed quantity associated with the element, means for connecting one winding of each unit to the corresponding windings of the other units in a circuit whose connections correspond reciprocally to the actual connections of the elements of the assembly, means for connecting the other winding of the unit to the corresponding windings of the other units in an independent circuit whose connections correspond directly to the actual connections of the assembly elements, switching means in said inter-unit connections whereby variations made at will in the direct circuit connection to suit the assembly connections automatically cause the appropriate variations in the reciprocal circuit connection, an A. C. source of energy, and means for energising at least one of the windings from such source.

3. In a machine for electrically evaluating quantities associated with an interconnected assembly of the kind in which each element of the assembly has associated with it certain fixed and variable quantities which are inter-related by one or more equations, such equations being of a like nature for all the elements of the assembly, whilst the variable quantities of a like character for the various elements of the assembly are also inter-related by one or more equations, the combination of a number of units one for each element of the assembly, each unit comprising a plurality of magnetically interlinked windings whose turns-ratios represent the values of fixed quantities associated with the element and means for interconnecting certain of the windings into groups to form in the unit two pairs of windings or winding groups, means for connecting the two windings or winding groups of the first pair of each unit to the corresponding windings of the other units respectively in two independent circuits whose connections correspond reciprocally to the actual connections of the elements of the assembly, means for connecting the two windings or winding groups of the second pair to the corresponding windings of the other units in two further independent circuits whose connections correspond directly to the actual connections of the assembly elements, an A. C. source of energy, and means for energising at least one of the windings from such source.

4. In a machine for electrically evaluating quantities associated with an interconnected assembly of the kind in which each element of the assembly has associated with it certain fixed and variable quantities which are inter-related by one or more equations, such equations being of a like nature for all the elements of the assembly, whilst the variable quantities of a like character for the various elements of the assembly are also inter-related by one or more equations, the combination of a number of units one for each element of the assembly, each unit comprising two transformers each having three windings whose turns-ratios represent the values of fixed quantities associated with the element and means for connecting the third and second windings on the first transformer in series respectively with the second winding and with the reversed third winding on the second transformer to form two winding groups, means for connecting the first windings on the two transformers of each unit to the corresponding windings of the other units in two independent circuits whose connections correspond reciprocally to the actual connections of the elements of the assembly, means for connecting the two winding groups of each unit to the corresponding winding groups of the other units respectively in two further independent circuits whose connections correspond directly to the actual connections of the assembly elements, an A. C. source of energy, and means for energising at least one of the windings from such source, the voltages or currents induced in the two first windings in each unit representing the resolved components of a variable planar vector quantity associated with the corresponding element of the assembly whilst those induced in the two winding groups represent the resolved components of another variable planar vector quantity associated with the corresponding assembly element.

5. The combination as defined in claim 1, wherein the means for connecting each winding of a unit to the corresponding windings of the other units comprises switching means for simultaneously controlling the independent circuits whereby variations made at will in the direct circuit connections to suit the assembly connections automatically cause the appropriate variations in the reciprocal circuit connections.

6. A unit for use in a machine for electrically evaluating quantities associated with an electrical network or other interconnected assembly of elements, comprising in combination a transformer having two windings, means for adjusting the number of effective turns of at least one of the windings, four groups of terminal contacts each having three contacts, means for connecting one terminal of the first winding to a contact of the first group and a contact of the second group, means for connecting the other terminal of the first winding to a contact of the third group and a contact of the fourth group, means for connecting one terminal of the second winding to another contact of the first group and another contact of the third group, means for connecting the other terminal of the second winding to another contact of the second group and another contact of the fourth group, means for connecting together the remaining contacts of the first and third groups, and means for connecting together the remaining contacts of the second and fourth groups.

7. A unit for use in a machine for electrically evaluating quantities associated with an electrical network or other interconnected assembly of elements comprising in combination two transformers each having three windings, means for simultaneously adjusting the turns-ratio of the second and first windings of the first transformer and that of the third and first windings of the second transformer such turns-ratios always being equal to one another, means for simultaneously adjusting the turns-ratio of the third and first windings of the first transformer and that of the second and first windings of the second transformer such turns-ratios always being equal to one another, means for connecting the third winding of the first transformer in series with the third winding of the second transformer, and means for connecting the second winding of the first transformer in series with the reversed second winding of the second transformer.

8. The combination with the features set forth in claim 7, of four groups of terminal contacts each having six contacts, means for connecting one terminal of the first winding of the first transformer to the first contact of the first group and the first contact of the second group, means for connecting the other terminal of such winding to the first contact of the third group and the first contact of the fourth group, means for connecting one terminal of the first winding of the second transformer to the second contacts of the first and second groups, means for connecting the other terminal of such winding to the second contacts of the third and fourth groups, means for connecting one terminal of the series-connected pair of second windings to the third contacts of the first and third groups, means for connecting the other terminal of such pair of windings to the third contacts of the second and fourth groups, means for connecting one terminal of the series-connected pair of third windings to the fourth contacts of the first and third groups, means for connecting the other terminal of such pair of windings to the fourth contacts of the second and fourth groups, means for connecting the fifth and sixth contacts of the first group respectively to the fifth and sixth contacts of the third group, and means for connecting the fifth and sixth contacts of the second group respectively to the fifth and sixth contacts of the fourth group.

9. The combination with the features set forth in claim 7, of two sets of terminal contacts for alternative use, one set comprising four terminal contact groups each having six contacts and the other set eight terminal contact groups each having three contacts, means for connecting the two first windings, the pair of second windings and the pair of third windings to individual contacts of the four six-contact groups, means for connecting the first and second windings of the first transformer to the individual contacts of four of the three-contact groups, and means for connecting the first and second windings of the second transformer to the individual contacts of the other four three-contact groups, whereby the unit may alternatively be employed as a single unit in the performance of calculations involving complex quantity multiplication by the use of the six-contact groups or as a pair of independent units in the performance of calculations involving scalar quantity multiplication by the use of the three-contact groups.

CHARLES LORD BLACKBURN.